United States Patent [19]

Van Gompel

[11] 4,022,292
[45] May 10, 1977

[54] PORTABLE TREE STAND OR CROWS NEST

[76] Inventor: James J. Van Gompel, P.O. Box 397, Rte. No. 4, Fremont, Ind. 46737

[22] Filed: Aug. 12, 1976

[21] Appl. No.: 713,792

[52] U.S. Cl. .................................. 182/33; 182/34; 182/187; 182/196; 182/164; 224/9

[51] Int. Cl.² ............................................ A47C 9/10

[58] Field of Search ............... 182/187, 20, 21, 33, 182/34, 196, 164; 224/9

[56] References Cited

UNITED STATES PATENTS

| | | | |
|---|---|---|---|
| 2,851,085 | 9/1958 | Woodward | 182/187 |
| 3,352,379 | 11/1967 | Riggs | 182/187 |
| 3,368,725 | 2/1968 | Martin | 182/187 |
| 3,730,294 | 5/1973 | Thurmond | 182/187 |
| 3,817,350 | 6/1974 | Gray | 182/187 |

Primary Examiner—Reinaldo P. Machado

[57] ABSTRACT

A portable tree stand which can be used for hunting or other purposes and which can be pushed to any desired height with the use of a pole which fits into a receptacle and includes a pair of rollers mounted at an angle on one side of the tree and a roller locking claw on the other side of the tree which locks the stand at the desired height. A ladder extends downwardly from the stand and allows the hunter to climb up to the stand after which the ladder can be pulled upwardly to the stand to make into a chair. Heating means as well as gun and bow and arrow holding means are provided on the stand. Also, the stand can be used as a back pack, as a chair, a cot, a table or a litter for carrying injured persons, or when desired, for toting heavy loads.

17 Claims, 14 Drawing Figures

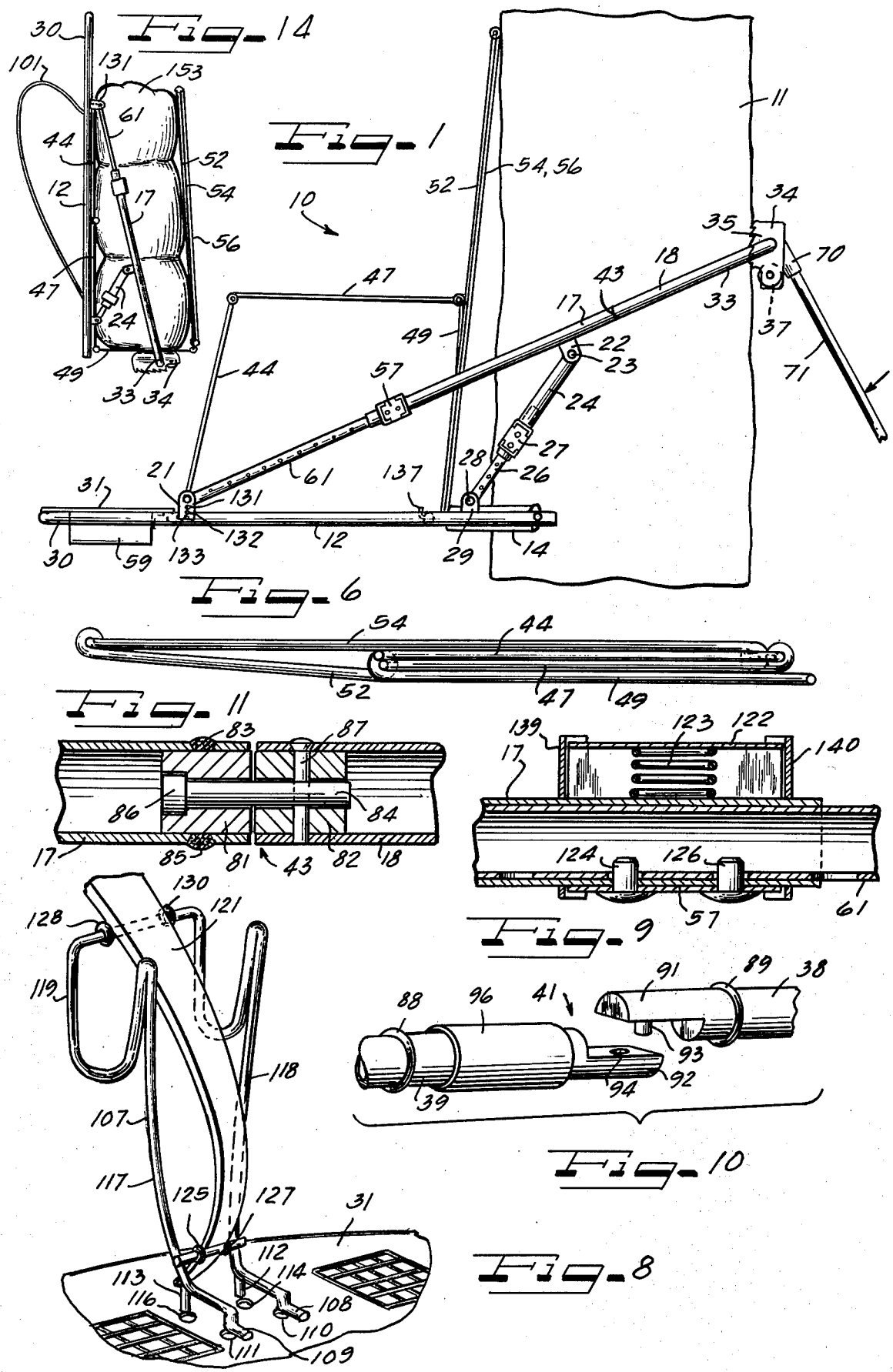

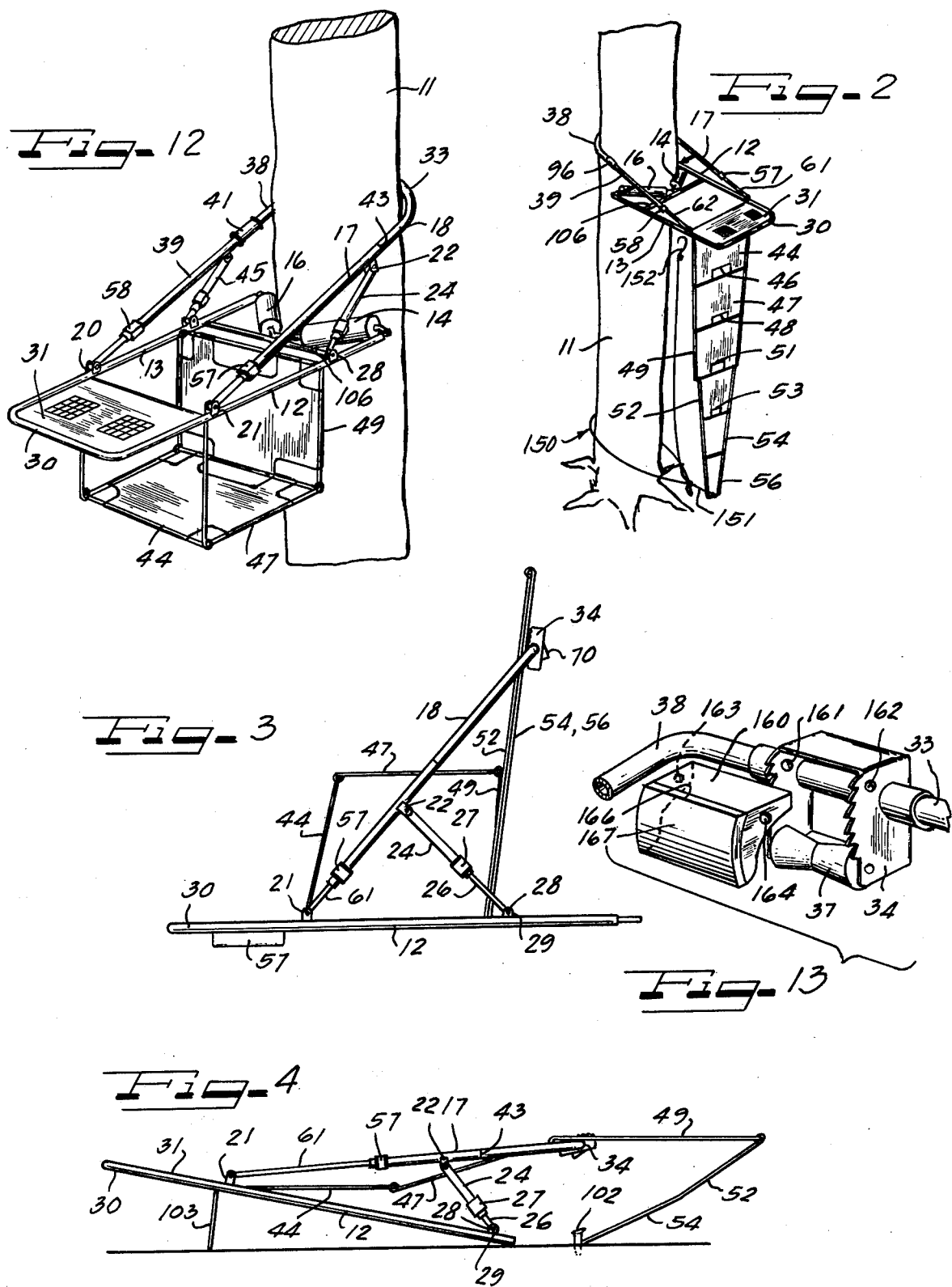

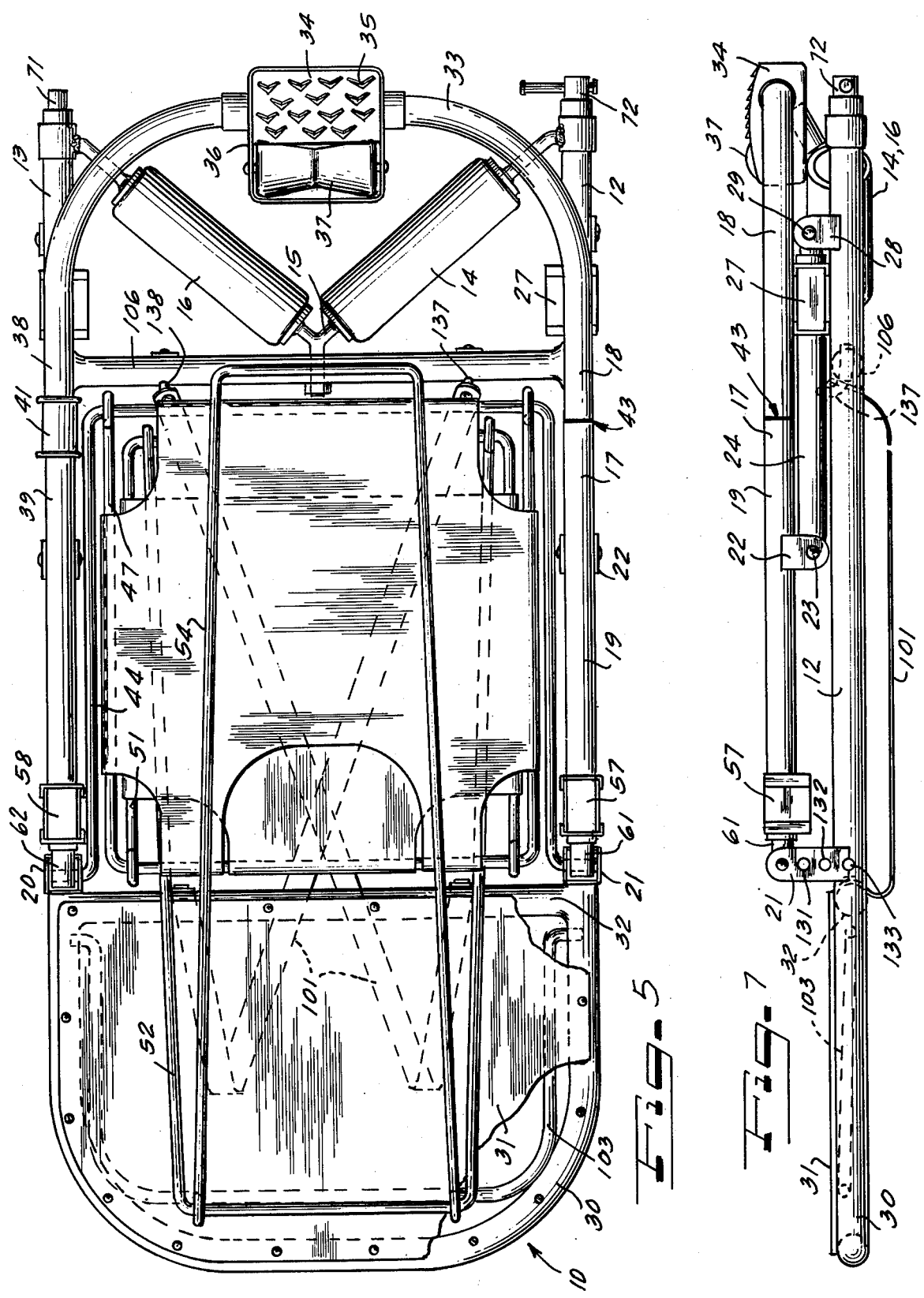

PORTABLE TREE STAND OR CROWS NEST

BACKGROUND OF THE INVENTION

1. Field of the Invention

This invention relates in general to a quickly mountable and demountable tree stand for hunting or other purposes as well as to a portable chair, table, litter, cot, or a back pack.

2. Description of the Prior Art

The use of tree stands for observing or hunting animals has been restricted in many States to units which will not injure the trees and which can be very rapidly assembled and disassembled. Prior art tree stands have used nails or spikes driven into the trees which are injurious to the tree and which are prohibited by law in many States.

Certain stands of the prior art are subject to collapse and fall because they do not lock into the tree to prevent relative movement therebetween.

Many tree stands of the prior art are awkward and heavy to carry and since such units must often be transported for long distances this renders them impractial and awkward to move, erect and dismount.

SUMMARY OF THE INVENTION

The present invention provides a tree stand or crows nest which can be very rapidly mounted and demounted from a tree which includes a plurality of telescoping members with a quick connect feature which allows the support arm to be wrapped around the tree with sleeves to make a quick disconnect which are held in place by O-rings or by spring biased means. Included is a roller claw with teeth that are small enough not to damage smooth bark trees but strong enough and numerous enough so as to prevent slippage. A pair of rollers on the opposite side of the tree that makes the platform stable by virtue of the three point contact formed in conjunction with the roller claw, which in turn allows the unit to be quickly mounted and demounted from a tree. A pole is provided which is receivable in the roller claw for pushing the unit up as desired on the tree and for lowering the stand.

A folding ladder is provided from the unit to allow the user to climb up to the stand after which the ladder can be pulled up to the stand to provide a seat. A heater as well as a gun and bow holder are provided.

Telescopically fitting pole members are provided which fit singly into the open ends of the framework. The poles are removable for the purpose of raising and lowering the stand to the desired height. Also, in a partially extended position they serve as the rear handles when the stand is used as a litter or when toting heaving loads with two or more people.

The folding ladder along with the various telescoping members allow the unit to be made into a chair, a cot, a litter, a table or a back pack for use in carrying, sitting, lying or standing.

The provision of telescoping supporting arms allow infinite adjustment of the various units so as to fit any tree.

Other objects, features and advantages of the invention will be readily apparent from the following description of certain preferred models thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 1 is a perspective view illustrating the stand mounted to a tree;

FIG. 2 illustrates the ladder hanging down from the stand;

FIG. 3 illustrates the stand and ladder formed into a chair;

FIG. 4 illustrates the unit formed into a cot;

FIG. 5 illustrates the stand in the folded position;

FIG. 6 illustrates the ladder in the folded position;

FIG. 7 is a side view of the folded unit excluding the ladder;

FIG. 8 is a detailed view illustrating the bow and gun holder;

FIG. 9 is a detailed sectional view of a latching means;

FIG. 10 illustrates the quick connect structure;

FIG. 11 is a detailed sectional view of a swivel joint;

FIG. 12 illustrates the invention mounted on a tree in a second configuration;

FIG. 13 is a perspective view of a modification; and

FIG. 14 illustrates a back pack.

DESCRIPTION OF THE PREFERRED EMBODIMENTS

The invention comprises a tree stand which can be folded to form a back pack and which can be assembled so as to be mounted upon a tree or pole. As shown in FIGS. 1, 2, 5 and 12 a pair of side frame members 12 and 13 have first ends joined by a tubular portion 30 which attaches to the tubular members 12 and 13 and a platform 31 extends across between the members 12 and 13 adjacent the cross portion 30. A pair of rollers 14 and 16 are pivotally attached to the ends of the frame members 12 and 13 by a suitable support 15 and the rollers 14 and 16 are adapted to engage one side of a tree 11 as, for example, shown in FIG. 12.

A generally U-shaped structure comprises a pair of support arms 17 and 39 which have their lower telescopic extension arms pivotally attached to the members 12 and 13 and which has a central portion 33 which passes around the tree 11. A pivot 43 is shown in detail in FIG. 11 and a quick disconnect joint 41 shown in detail in FIG. 10 allows the portion 33 to be broken at the joint 41 and the portion 33 passed around the tree such that the roller claw 34 mounted on the central portion 33 as shown in FIG. 1 and shown in plan view in FIG. 5 can be mounted such that its teeth 35 bite into and grip the bark or surface of the tree 11. Telescoping junctions 57 and 58 shown in detail in FIG. 9 allow the length of the support arms 17 and 39 to adjust on telescoping rods 61 and 62 to various lengths, so that the unit can be adapted to fit around trees having different diameters. Rods 61 and 62 are pivotally attached at brackets 20 and 21 to base members 12 and 13.

A brace member is attached between each of the arms 17 and 39 to the base members 12 and 13. As shown in FIG. 1, a telescoping brace 24 comprises an upper portion which is pivotally attached by pin 23 to bracket 22 connected to arm 17 and a telescoping junction 27 connects a telescoped rod 26 formed with holes to allow adjustment and which has its opposite end connected by pin 28 to the bracket 29 mounted on the frame member 12. A corresponding telescoping brace 45 extends from member 39 to member 13.

The roller claw 34 is provided with a socket 70 into which telescopic extension poles 71 and 72 can be fitted so as to push the unit up the tree and to remove the unit from the tree. A roller 37 is attached to the lower portion of the roller claw 34 and engages the surface of the tree as it is being pushed up the tree or is being lowered from the tree. In operation as you view FIG. 1, when extension pole 71 is moved toward the tree, as indicated by arrow, the roller 37, on the right, a well as rollers 14 and 16 on the left are all engaged to the tree and allow free up and down rolling movement. When one stops and moves pole 71 away from the tree the claw grips and holds at that point. When the tree stand is at the desired height and the extension pole removed, the weight of the stand at the opposite side of the tree transfers the point of contact from the roller 37 to the teeth 35 of roller claw 34. By adding weight to the platform 31, as in FIG. 1, such as climbing the ladder would do, greater bite is gained at teeth 35 and increased bearing is encountered by rollers 14 and 16 against the tree, which increases the stability of the unit.

As seen in FIGS. 2 and 7, a ladder is pivotally connected in one of several pair of holes 131, 134, 132, 135, or 133, 136 formed in the bracket 21. The ladder extends downwardly from the support members 12 and 13 adjacent the platform 31 and is formed of a first portion 44 pivotally connected at its upper end to the members 12 and 13 and formed with a foot hole 46. A second ladder portion 47 is slightly narrower than the portion 44 and is pivotally connected to the portion 44 and is formed with a foot hole 48. A third ladder portion 49 is slightly narrower than the portion 47 and is pivotally attached to the lower end of the portion 47 and is formed with a foot hole 51. A fourth ladder portion 52 is slightly narrower than the portion 49 and is formed with a foot opening 53. A fifth ladder portion 54 has an opening into which the foot can be inserted and is narrower than the portion 52. A sixth latter portion 56 is pivotally connected to the lower end of the portion 54 and is open so that the foot may be inserted therein. As shown in FIG. 2, when the unit is in its desired position on the tree 11 the user may climb up the ladder comprising the members 56, 54, 52, 49, 47 and 44 emerge through the opening formed by members 12, 13, 106 and platform 31. When on platform 31 he may then pull the ladder through said opening and make it into a chair such as shown in FIG. 1 or alternatively such as shown in FIG. 12. The chair is formed by placing rings of ladder portion 49 onto hooks 137 and 138 of cross arm 106. Ladder portions 44 and 49 form the legs of chair while portion 47 forms the seat and 52, 54 and 56 form a back rest portion of the chair as they lean against the tree. Referring to portions 44, 47 and 49 of ladder, said portion may have attached thereto a web like material which will serve to support a person when using the ladder portions as part of the chair or cot concept. Webbing may be suitably reinforced where needed and may likewise be removable as for example by the use of snaps, hooks, and eyes or laces.

The swivel joint 43 is illustrated in sectional view in FIG. 11. The tubular frame members 17 and 18 are provided with internal blocks 81 and 82. The block 81 is affixed to the end of tubular member 17 by welds 83 and 85. A pin 84 extends through the blocks 81 and 82 and has a head 86 which engages the block 81. A dowel 87 extends through the walls of the tubular member 18, block 82 and pin 84 so that when the member 18 is rotated relative to the member 17, the pin 84 likewise rotates within block 81 of tube 17. Thus, the members 17 and 18 can be rotated relative to each other about the axis determined by the pin 84. The members 38 and 39 are joined by the disconnect 41 as shown in FIG. 10. A first O-ring 88 is mounted about the member 39 and a second O-ring 89 is mounted about the member 38. The ends 91 and 92 of the members 38 and 39 are formed into half cylindrical mating portions and a pin 93 extends from portion 91 and is receivable in a mating opening 94 formed in portion 92. A slip over sleeve 96 is adapted to be slipped over the portions 91 and 92 after they are in engagement so as to lock the members 38 and 39 together. The O-rings 88 and 89 assure that the sleeve 96 will not move relative to the members 38 and 39 and the O-rings 88 and 89 can be moved against the ends of the sleeve 96 to hold it over the joint formed by the portions 91 and 92. Sleeve 96 is long enough to assure rigidity of members 38 and 39 when properly assembled.

As best shown in FIGS. 5 and 7, members 12 and 13 have open ends for receiving the pole 71 and other members 72 which can be stored therein.

As shown in FIG. 7, slings 101 can be attached to the cross member 32 so as to convert to a back pack unit when the device is in a collapsed position. This allows the unit to be transported to and from the station where it is to be used.

In a partially opened state such as seen in FIG. 14, the unit becomes a back pack for toting camping gear such as tents, bed rolls and cooking gear when going to and from camp sites. In such a configuration note that telescoping members 61 and 17 as well as corresponding members 62 and 39, interconnected by central portion 33, are partially extended and held in place by bracing members 24 and 45. Ladder members 44 and 47, respectively, hang downwardly from holes 131 and 134. Ladder member 49 in turn is connected to said member 47. Said member 49 being webbed forms the bottom as it rests upon roller claw 34 attached to cross portion 33. The remaining links 52, 54 and 56 of the ladder, protrude upwards from said section 49, to form a retainer for the load 153 contained therein. Said links 52, 54 and 56 may then be laced to frame members 12 and 13 with the cord 150 to contain said load.

In the above described manner, the convertible tree stand becomes a useful tool to the members of a hiking party in that it comprises a back pack as well as a cot, a chair and a litter.

FIG. 4 illustrates the unit set up as a cot wherein a stake 102 is placed into the ground and can be adjustedly attached to the ladder portions to obtain the desired elevation. A pillow can be placed on the platform portion 31 and a supporting member 103 can be mounted from the members 12 and 13, respectively, to the ground to support beneath the head.

As shown in FIG. 12, a transverse member 106 extends between the portions 12 and 13 having hooks 137 and 138, best seen in FIGS. 5 and 7.

FIG. 8 illustrates a holder 107 which is formed with ends 108 and 109 receivable in openings 110 and 111 of the platform 31 and are further provided with projections 112 and 113 which are receivable in openings 114 and 116, respectively, of the platform 31. The member 107 has legs 117 and 118 which extend upwardly and a bow engaging portion 119 is connected between the legs 117 and 118 so as to receive a bow 121 or cradle a gun. O-rings 125 and 127, as well as 128 and 130, respectively, are provided as an adjusting means for supporting the bow, since bows do vary in width.

In use after the unit has been assembled and mounted to the tree at the proper height the user climbs up the ladder and draws it up through the opening between the members 12 and 13 and forms the chair as shown in FIG. 1 or, alternatively, as shown in FIG. 12. The platform 31 may have a compartment 59 for heating or cooking purposes and the user can stand on the platform 31 or sit on the chair formed from the ladder as shown in FIGS. 1 and 12. As shown in FIG. 1, second ladder portion 47 forms the seat while platform 31 forms the foot rest, whereas in FIG. 12 the seat is formed by platform 31 and the foot rest is formed by ladder portion 47. In this manner one can observe from behind the tree while being further hidden from large game animals. As shown in FIG. 7, holes 131, 132 and 133 and corresponding holes 134, 135 and 136 are provided for seat tilt adjustment.

FIG. 9 illustrates the telescoping joints such as 57 and 58. Tubular member 61 fits into larger tubular member 17 and a locking sleeve 122 carries pins 124 and 126 which can be moved out of engagement with the holes formed in member 61 by depressing the sleeve 122 against the spring 123. This allows the member 61 to be adjusted relative to member 17. Sleeve 122 is guided in a guide means 139, 140 such as would be formed by angle or channel iron. Guides also serve to protect tubular member 122 from accidental bumping which could otherwise disengage the pins 124 and 126. Pins 124 and 126 may have their surfaces knurled for a more positive grip.

After the unit has been used, the chair converts into a ladder again by dropping it through the opening between the members 12 and 13 and the user can climb down from the platform and lower the unit by inserting the pole 71 into the opening 70 of the member 34 to lower it from the tree. The coupling 41 is opened by moving the sleeve 96 from the members 91 and 92 and the portion 33 is removed from around the tree and the unit assembled as shown in FIGS. 5 and 7.

It is to be realized, of course, that the unit can be used on the ground as a chair as shown in FIG. 3, a cot as shown in FIG. 4 and can be used as a sling for transporting injured persons by two or more carriers.

In FIG. 2 in the drawings, a rope 150 has a first end 151 tied to the bottom ladder link and loops around the base of the tree or pole. The rope is then tied to itself in slip fashion and the second end of said rope is looped through the mans belt, by means of a hook 152. The ladder may be staked into the ground as an alternate method. Staking or trying of the ladder, greatly stabilizes said ladder from swaying to and fro as well as sideways.

When the individual reaches the top he may give the rope a slight tug, releasing the slip knot. Then dropping the second end to the ground he can proceed to pull the ladder seat up through opening or passage way.

FIG. 13 illustrates a modification wherein a pressure pad 160 may be connected to roller claw 34 by using bolts which pass through pinning holes 161 and 162 and are received into pinning openings 163 and 164 of the pressure pad 160. The face 166 of pad 160 is covered by rubber pad 167. The roller 37 is not covered by the pad 167.

A further intention is that the vertical members of the links of the ladder are not parallel. This eliminates side sway when the user is climbing up the ladder.

Although the invention has been described with respect to preferred embodiments it is not to be so limited as changes and modifications may be made which are within the full intended scope of the invention as defined by the appended claims.

I claim as my invention:

1. A portable tree stand comprising a frame with a platform on one end thereof, a pair of rollers mounted on axes which make an obtuse angle with each other at the other end of said frame member, an opening formed in said frame member between said platform and said other end, a foldable ladder sections attached to said frame member such that in a first position said ladder can be climbed, said foldable ladder moveable to a second position such that the foldable sections thereof can be formed into a chair, and attaching means attached to said frame member for detachably extending around a tree or other vertical support to lock said frame member to said tree.

2. A portable tree stand according to claim 1 wherein said attached means comprises a U-shaped member attached to said frame member, a pivoted joint between one side of said frame member and said U-shaped member and a locking disconnect joint between the other side of said frame member and said U-shaped member.

3. A portable tree stand according to claim 2 including a pair of telescoping joints mounted in each leg of said U-shaped member so as to allow the length of said legs to be adjusted.

4. A portable tree stand according to claim 3 including a pair of pivoted brace members extending between each leg of said U-shaped member and said frame member.

5. A portable tree stand according to claim 4 including a second pair of telescoping joints mounted in said pair of pivoted brace members.

6. A portable tree stand according to claim 2 including a locking claw attached to the middle of said U-shaped member and said claws engageable with the surface of a tree to lock said tree stand at a desired vertical height.

7. A portable tree stand according to claim 6 including an opening formed in said locking claw, and a lifting and lowering pole receivable into said opening to lift and lower said tree stand.

8. A portable tree stand according to claim 7 wherein said locking claw is pivotally attached to said U-shaped member and a transverse roller rotatably attached to said locking claw.

9. A portable tree stand according to claim 1 wherein said tree stand can be formed into a cot.

10. A portable tree stand according to claim 1 wherein said tree stand can be formed into a chair.

11. A tree stand according to claim 1 wherein said ladder is formed of a plurality of pivotally connected sections such that when the ladder is extended each section is narrower than its next higher section.

12. A portable tree stand according to claim 1 wherein said foldable ladder comprised of a plurality of U-shaped portions with the side arms of the U-shaped portions non-parallel so as to prevent side sway of the ladder.

13. A portable tree stand according to claim 1 including a heater and a weapon holder attachable to said platform.

14. A portable tree stand according to claim 6 which includes a detachable rubber adapter pad attached to said locking claw and said pad engageable with the surface of a pole having a smooth, hard surface whereupon steel claws would be rendered useless.

15. A portable tree stand according to claim 7 wherein said pole is comprised of one or more sections, and said sections being telescopically storable in the second ends of said frame members.

16. A portable tree stand according to claim 1 wherein said tree stand can be formed into a back pack for packing goods.

17. A portable tree stand according to claim 1 wherein said tree stand can be formed into a litter as for an injured person or for toting heavy loads.

* * * * *